United States Patent
Hayakawa et al.

[11] Patent Number: 5,838,411
[45] Date of Patent: Nov. 17, 1998

[54] LIQUID CRYSTAL DISPLAY DEVICE WITH UNEQUAL SIZED DUMMY SUB-ELECTRODES HAVING A SPECIFIC RELATIONSHIP

[75] Inventors: Kouji Hayakawa; Satoshi Endo; Hisashi Yoshida; Noboru Hoshino, all of Mobara; Masayoshi Fujieda, Isumi-gun, all of Japan

[73] Assignees: Hitachi, Ltd., Tokyo; Hitachi Device Engineering Co., Ltd., Mobara, both of Japan

[21] Appl. No.: 988,234

[22] Filed: Dec. 10, 1997

Related U.S. Application Data

[63] Continuation of Ser. No. 552,101, Nov. 2, 1995, abandoned.

[30] Foreign Application Priority Data

Nov. 14, 1994 [JP] Japan .................................. 6-279186
Feb. 6, 1995 [JP] Japan .................................. 7-17407

[51] Int. Cl.⁶ .................................................. G02F 1/1343
[52] U.S. Cl. .......................................... 349/139; 349/143
[58] Field of Search .................................. 349/139, 143, 349/106, 155

[56] References Cited

U.S. PATENT DOCUMENTS

| | | | |
|---|---|---|---|
| 4,842,377 | 6/1989 | Nakanowatari | 349/155 |
| 5,270,846 | 12/1993 | Watanabe et al. | 349/148 |
| 5,285,301 | 2/1994 | Shirahashi et al. | 349/143 |
| 5,504,601 | 4/1996 | Watanabe et al. | 349/155 |

FOREIGN PATENT DOCUMENTS

| | | |
|---|---|---|
| 62-49323 | 3/1987 | Japan . |
| 62-229234 | 10/1987 | Japan . |
| 62-266427 | 11/1988 | Japan . |
| 1-269916 | 10/1989 | Japan . |
| 2-2518 | 1/1990 | Japan . |
| 2-123325 | 5/1990 | Japan . |
| 4-55022 | 5/1992 | Japan . |

Primary Examiner—William L. Sikes
Assistant Examiner—Julie Ngo
Attorney, Agent, or Firm—Antonelli, Terry, Stout & Kraus, LLP

[57] ABSTRACT

A liquid crystal display device includes a liquid crystal display panel. The liquid crystal display panel includes a first transparent substrate having color filters arranged in a predetermined order, a patterned light blocking film formed between the color filters and first transparent electrodes formed on the color filters; a second transparent substrate having second transparent electrodes arranged to intersect the first transparent electrodes; a liquid crystal layer sandwiched between the first and second transparent substrates with the first and second transparent electrodes opposing each other and spacers dispersed between the first and second transparent substrates. The color filters and the light blocking film extend into a marginal area outside an area optically switchable upon application of an electric field on the liquid crystal display panel in substantially the same geometric pattern as within the optically switchable area. A plurality of dummy electrodes can also be formed in the marginal area on at least one of the first and second substrates, so as to oppose the transparent electrodes on the opposite substrate. The extension of the color filters and the light blocking film into a marginal area and the disposition of the dummy electrodes in the marginal area can be applied in one liquid crystal display panel, singly or in combination.

1 Claim, 12 Drawing Sheets

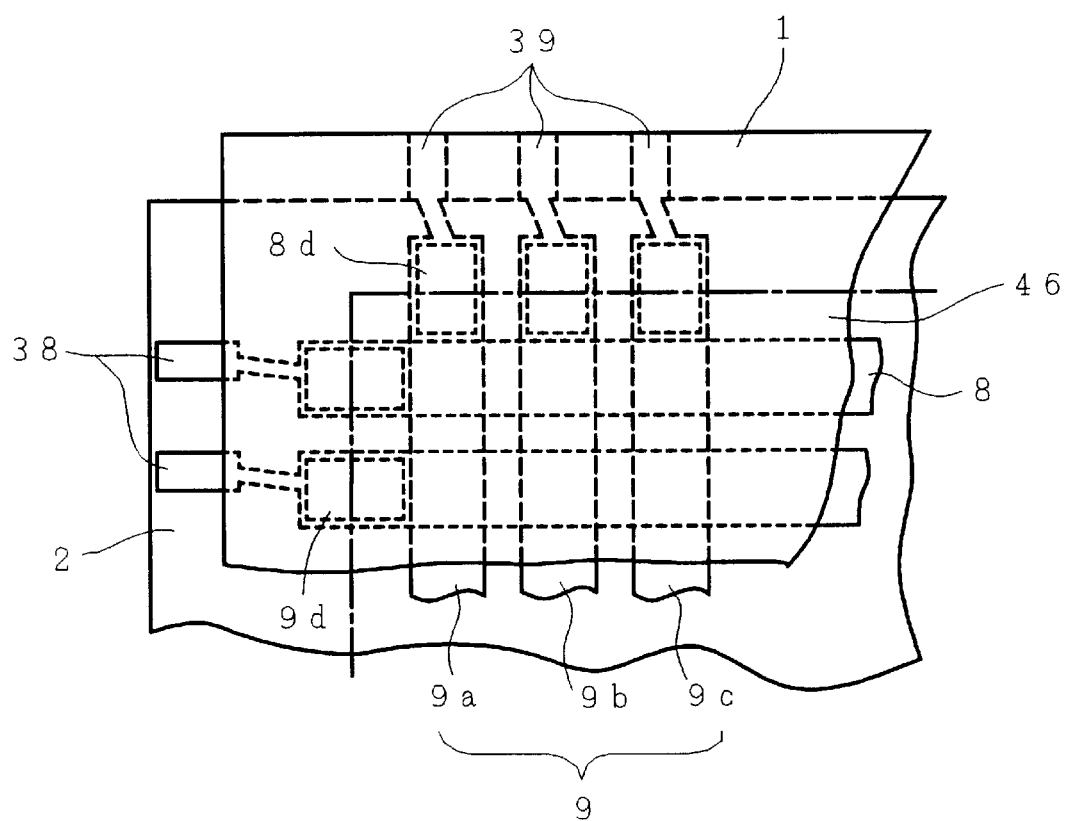

LIQUID CRYSTAL DISPLAY DEVICE WITH UNEQUAL SIZED DUMMY SUB-ELECTRODES HAVING A SPECIFIC RELATIONSHIP

CROSS REFERENCE TO RELATED APPLICATION

This is a continuation of U.S. application Ser. No. 08/552,101, filed Nov. 2, 1995, the subject matter of which is incorporated by reference herein.

BACKGROUND OF THE INVENTION

The present invention relates to a liquid crystal display device and more particularly to a liquid crystal display device having a color filter incorporated therein.

Liquid crystal display devices in many fields as image display devices in recent years.

The liquid crystal display devices generally comprise at least an upper frame having a display window, a liquid crystal display panel having drive circuits integrally mounted thereon, a light guide assembly made up of a light diffuser and a light guide, an intermediate frame having a linear back-light source on at least one side thereof, and a lower frame. The components are stacked and fixed in the order mentioned above with the upper and lower frames joined together to fix the components in a unit.

FIG. 1 depicts a plan view illustrating a color liquid crystal display panel for use in a color liquid crystal display device of the simple matrix type.

FIG. 2 depicts a cross-sectioned view of the color liquid crystal display panel taken along line 100—100' of FIG. 1.

FIGS. 2 and 3 show a color liquid crystal display panel having a substrate 1 (hereinafter referred to as the segment electrode substrate) for carrying segment electrodes (column electrodes) 9, a substrate 2 (hereinafter referred to as the common electrode substrate) for carrying common electrodes (row electrodes) 8, light blocking films 3 and 33, color filters R (red) 4, G (green) 5, and B (blue) 6, a protective layer 7, the common electrodes 8, the segment electrodes 9, a dummy electrode 9d, insulating films 10, alignment films 11, spacers 12, a liquid crystal layer 13, a sealing material 14, and dummy color filters 34, 35, and 36.

The common electrode substrate 2 is formed of glass or the like and has the color filters 4, 5, and 6 and the light blocking film 3 formed thereon. The color filters 4, 5, and 6 and the light blocking film 3 have the protective layer 7 formed thereon.

A plurality of the strip-like common electrodes 8 of transparent conductive material (ITO) are formed on the protective layer 7.

The segment electrode substrate 1 is formed of glass or the like and has the strip-like segment electrodes 9 of transparent conductive material (ITO) formed thereon.

The segment electrodes 9 and the common electrodes 8 have the insulating film 10 and the alignment film 11 formed thereon, respectively.

The color liquid crystal display panel shown in FIG. 2 can be assembled by initially sealing together a segment electrode substrate 1 and a common electrode substrate 2 along the outer edges thereof with spacers 12 interposed therebetween with a sealing material 14. Subsequently, liquid crystal material 13 is injected between the substrates via an opening (not shown) provided in the seal border 14 and the opening is sealed by an epoxy resin or the like.

The common electrodes 8 and the segment electrodes 9, as shown in FIG. 2, are arranged orthogonal to each other. An individual group of segment electrodes 9 comprises segment electrodes 9a, 9b, and 9c for colors of red (R), green (G), and blue (B), respectively.

An intersection of a common electrode 8 and an individual group of R, G, and B segment electrodes 9a, 9b, and 9c forms one picture element.

The area of the front substrate of the color liquid crystal display panel, as shown in FIG. 1, is divided into an area 41 optically switchable upon application of an appropriate electric field to display images and an optically non-switchable area 42 surrounding the optically switchable area 41 and having no images displayed therein.

In FIG. 1, an area 46 enclosed by dot-dash lines is a display area viewable by a user through an opening of a frame (cover) encasing the display panel.

The space between the two opposing electrode-carrying substrates has virtually spherical, fine spacers of silica or plastics dispersed therein to maintain a predetermined gap between the two electrode-carrying substrates, the spacers being usually polymer beads (hereinafter referred to as the beads).

However, the spacers involve the following problem. Since the spacers are usually transparent, the beads dispersed in the display area allow an illumination light or reflected light to pass therethrough as light leakage. The light leakage causes the screen to be speckled with white spots and deteriorates the image quality.

To prevent the above-mentioned speckles, there were proposed some methods in the Japanese Patent Application Laid-Open (TOKKAI HEI) Nos. 3-118518 and 3-94230. The method proposed in TOKKAI HEI No. 3-118518 employs spacers which are colored densely dark to decrease light transmission. The method proposed in TOKKAI HEI No. 3-94230 places the spacers on the light blocking film to prevent the light leakage.

The color liquid crystal display device has color filters of a plurality of colors incorporated on one of the substrates of the liquid crystal display panel.

A color liquid crystal display panel includes a first transparent glass substrate provided with at least a plurality of color filters in a predetermined arrangement formed on an optically switchable area thereon, a light blocking film formed between the plurality of color filters and surrounding a periphery of the optically switchable area, dummy color filters formed on an area covered by the light blocking film surrounding the periphery of the optically switchable area, a first plurality of transparent electrodes formed on the plurality of color filters; a second transparent glass substrate provided with at least a second plurality of transparent electrodes arranged thereon in a direction to intersect the first plurality of electrodes; a liquid crystal sealed between the first and second transparent glass substrates with the first and second pluralities of transparent electrodes opposing each other; and spacers dispersed between the first and second transparent glass substrates.

The image quality of the color liquid crystal display device of this type can be improved by suppressing the light leakage in the periphery of the optically switchable area, or an area surrounding the display area.

Suppression of the light leakage, or the light blocking, in and around the periphery of the optically switchable area can be obtained by the following two known methods. In one method, an insufficient voltage incapable of switching on a picture element is applied across the liquid crystal layer associated with the dummy color filter. That is, a non-select waveform of a small voltage is applied to the electrode associated with the dummy color filter to change retardation Δnxd of the liquid crystal layer to suppress the light leakage in combination with a polarizer including a phase compensating sheet. In the other method, the color filter-carrying substrate (a first substrate) is provided with a continuous pattern of a light blocking film (black matrix, or BM in short) arranged outside of the useful optically switchable area thereof. The light blocking film is made to have a plurality of color filters (dummy color filters) formed thereon so that a cumulative area of the color filters per unit area should be virtually equal to that of the color filters in the optically switchable area per unit area, although each of the dummy color filters is smaller than the color filter in the optically switchable area.

However, if a useful optically switchable area (hereinafter referred to as the optically switchable area) is increased while maintaining the external dimensions of the liquid crystal display panel unchanged, the area outside the optically switchable area is decreased. This makes it impossible to mount a circuit for applying the above-mentioned non-select waveform to the electrodes associated with the dummy color filters. Therefore there has been employed a continuous frame-like light blocking pattern to suppress the leakage of light.

FIG. 3 depicts a plan view illustrating major portions of the prior art color filter-carrying substrate, that is, a first substrate (common electrode substrate), for use in the liquid crystal display panel of the STN (Super Twisted Nematic) type. The prior art substrate includes an optically switchable area 41, an optically non-switchable area 42 (hereinafter referred also to as the dummy area), color filters 43, and a light blocking pattern 44 (so-called BM).

As shown in the figure, the optically switchable area 41 is enclosed by the optically non-switchable area 42.

In the optically switchable area 41 the light blocking pattern (BM) 44 surrounds and optically defines each element filter 43 of a plurality of kinds of colors red (R), green (G) and blue (B) to ensure resolution.

FIG. 4 depicts a cross-sectioned view illustrating major portions of the prior art liquid crystal display panel shown in FIG. 3. Arrangements and parts in the figure identical with those in FIGS. 2 and 3 are indicated by the same numbers. In the figure are indicated a first substrate (referred to as the common electrode substrate) 2 usually of transparent glass, a second substrate (referred to as the segment electrode substrate) 1 usually of transparent glass, an overcoat layer 7, common electrodes 8, segment electrodes 9 for switching, a dummy segment electrode 45, an insulating film 10, alignment films 11, a liquid crystal layer 13, a sealing material 14, and polymer beads 12 acting as spacers.

The color liquid crystal display panel of that type has the above-mentioned three color filters for R, G, and B disposed at the switchable picture elements of the corresponding colors in the optically switchable area 41. A black matrix (BM) 44 is disposed between the color filters to block a passage therethrough of a back-light. This prevents mixture of adjacent colors and ensures definition between the picture elements to obtain a high definition display.

On the other hand, an optically non-switchable area 42, or a dummy area, disposed outside the optically switchable area 41 prevents the back-light from leaking and contributes to a clear image display.

The BM provided in the optically non-switchable area 42 of the first substrate (common electrode substrate) 2 carrying the color filters is formed in a continuous pattern in the area. The BM is formed of a thin metal film, such as a chromium film having a high light-blocking capability, or an organic resin film containing a black pigment or dye.

The chromium film for the BM film can be made thin, but involves the problem that the light reflected by it deteriorates image quality. The organic resin film colored black is also used because of low cost, but with a disadvantage of increase in thickness.

Returning to FIGS. 1 and 2, the optically non-switchable area 42 is an area provided in such a way as to establish a uniform thickness of the liquid crystal layer 13 in the optically switchable area 41. In the optically non-switchable area 42 there are dummy color filters 34, 35, and 36, a light blocking film 33, and dummy electrodes 8d and 9d, the dummy electrodes 8d being not shown in FIG. 2.

FIGS. 5A and 5B respectively depict plan and perspective views illustrating an arrangement of the common electrodes 8, the segment electrodes 9, and the dummy electrodes 8d and 9d of the color liquid crystal display panel shown in FIG. 2. The figures show the positions of the common electrodes 8, the segment electrodes 9, and the dummy electrodes 8d and 9d in an area A in FIG. 1.

In the figures are indicated terminals 38 and terminals 39 for the common electrodes 8 and the segment electrodes 9, respectively.

As shown in the figures, the segment electrode substrate 1 has the dummy electrodes 9d formed thereon so as to extend in a direction perpendicular to the segment electrodes 9, and the common electrode substrate 2 has the dummy electrodes 8d formed thereon so as to extend in a direction perpendicular to the common electrode 8.

The dummy electrodes 9d and dummy electrodes 8d are formed in registration with the common electrodes 8 and the segment electrodes 9, respectively, with the liquid crystal layer 13 sandwiched therebetween outside the optically switchable area 41.

Other prior art arrangements of electrodes for liquid crystal display devices are described in Japanese Patent Application Laid-Open Nos. 62-49323 laid open on Mar. 4, 1987 and 4-55022 laid open on May 12, 1992.

SUMMARY OF THE INVENTION

A first substrate carrying color filters is bonded with a second substrate carrying transparent picture element electrodes (second electrodes or segment electrodes) and an alignment film formed thereon with a predetermined cell gap therebetween. The cell gap is maintained with spacers of a predetermined diameter.

In the prior art described with reference to FIGS. 3 and 4, the dummy area 42 is formed of only the BM 44. Since the color filters 43 in the optically switchable area 41 have a thickness different from that of the BM 44, the cell gap is wider in the dummy area 42 than in the optically switchable area 41, causing a gap difference between the optically switchable area 41 and the optically non-switchable area 42.

To bond the first substrate (common electrode substrate) 2 with the second substrate 1, both the substrates are pressed together with the spacers 12 interposed therebetween before being fixed with the sealing material 14.

The spacers 12 for retaining the gap between the first substrate (common electrode substrate) 2 and second substrate 1 should be ideally dispersed therebetween at a uniform density over the cell. If the opposing surfaces of both the substrates are not flat but have steps, pressing both the substrates together with the spacers of a uniform diameter therebetween causes non-uniformity in the spacing therebetween at the steps. The non-uniformity in the spacing causes local variations in threshold voltage of the display panel, or brings about local variations in brightness on the screen, resulting in degradation of image quality.

Further, the prior art involves the problem that, if in the color liquid crystal display panel shown in FIGS. 2, 5A, and 5B the adjacent dummy electrodes 8d or 9d provided for improving uniformity of the liquid crystal layer thickness are short-circuited, the liquid crystal layer 13 in contact with the dummy electrode 8d or dummy electrode 9d is turned on and degrades the image quality of the color liquid crystal display panel.

FIG. 6 depicts a plan view illustrating a short-circuit between the adjacent dummy electrodes 8d or 9d of the color liquid crystal display panel shown in FIGS. 2, 5A, and 5B. The preceding problem will be described in more detail below by reference to the figure.

In the figure is indicated a short-circuited portion 8e. In the example shown in the figure, the dummy electrodes opposing the segment electrodes 9a and 9b respectively, are short-circuited, among the dummy electrodes 8d formed on the common electrode substrate 2. The short-circuit, as shown in the figure, forms a current path 30 of the segment electrode 9a to the liquid crystal layer 13 to the dummy electrode 8d to the short-circuited portion 8e to the dummy electrode 8d to the liquid crystal layer 13 to the segment electrode 9b.

Depending upon the magnitudes of voltages applied on the segment electrodes 9a and 9b for switching, a current through the current path 30 and the liquid crystal layer 13 in contact with the dummy electrodes 8d was sometimes caused to flow.

The spurious turning-on of the liquid crystal layer is one of the causes that degrade the image quality of the color liquid crystal display panel. To prevent the spurious turning-on, the prior art color liquid crystal display panel required a test for a short-circuit between dummy electrodes.

With a view toward solving the foregoing problems of the prior art, it is an object of the present invention to provide a liquid crystal display device that can display a quality image by preventing image deterioration due to the difference in thickness of the liquid crystal layer between the optically switchable area and the optically non-switchable (dummy) area.

Briefly, to accomplish the foregoing object, in accordance with one aspect of the present invention, the liquid crystal display device includes a liquid crystal display panel comprising at least a first transparent substrate having, at least, a plurality of kinds of filters of a plurality of colors arranged in a predetermined order, a patterned light blocking film formed between said plurality of kinds of filters and a first plurality of transparent electrodes formed on the plurality of kinds of filters; a second transparent substrate having at least a second plurality of transparent electrodes thereon arranged to intersect the first plurality of electrodes; a liquid crystal layer sandwiched between the first and second substrates with the first and second pluralities of transparent electrodes opposing each other; and spacers dispersed between the first and second substrates, the plurality of kinds of filters and the light blocking film extending outside an area optically switchable upon application of an appropriate electric field thereto and being in substantially the same geometric pattern as within the optically switchable area.

In accordance with the present invention, spacers of a virtually uniform diameter are dispersed at a virtually uniform density in a gap (a cell gap) between the first and second substrates over the entire gap area to establish a uniform gap.

In the structure of the present invention, the dummy area outside the useful optically switchable area is configured so as to have a BM layer of the same pattern as in the useful optically switchable area and to dispose color filters thereon in registration with openings in the BM layer, so that the cell gap becomes uniform over both the dummy area and the useful optically switchable area. The above-mentioned local variations in threshold voltage of the display panel are prevented and a high quality image is displayed.

The structure of the color filters arranged in the dummy area can be exactly the same as that in the optically switchable area in terms of the number of colors, three, for instance, and the order of arrangement of colors, but the invention is not limited to this structure. It is possible to form color filters in the dummy area with filters of one color or two chosen from among the plurality of colors of the filters in the optically switchable area at the time of forming the color filter or color filters in the optically switchable area for the purpose of simplifying the fabrication of the dummy area.

It is another object of the present invention to provide a liquid crystal display device that can display a quality image and eliminate the need for a short-circuit test of dummy electrodes provided for improving uniformity of the liquid crystal layer thickness of the display panel by decreasing occurrences of short-circuits between the dummy electrodes and preventing spurious switching on in the optically non-switchable area inside the display area defined by a frame of the liquid crystal display device.

The liquid crystal display device in accordance with another aspect of the present invention includes a liquid crystal display panel comprising at least a first substrate having a first plurality of electrodes thereon; a second substrate having a second plurality of electrodes thereon arranged perpendicular to the first plurality of electrodes; a liquid crystal layer sandwiched between the first and second substrates with the first and second pluralities of electrodes opposing each other; and dummy electrodes formed outside an optically switchable area upon application of an appropriate electric field thereto on at least one of the first and second substrates, opposing one plurality of the first and second pluralities of electrodes formed on one substrate of the first and second substrates opposing the at least one of the first and second substrates, each of the dummy electrodes opposing an electrode of the first or second electrodes divided into a plurality of sub-electrodes.

Since the structure of the present invention calls for the dummy electrodes formed on the electrode-carrying substrates of the liquid crystal display panel being formed of a plurally of the sub-electrodes, the probability of a short-circuit failure of adjacent dummy electrodes in the display area can be reduced and spurious switching-on in the optically non-switchable area inside the display area can be prevented. This feature can improve the display quality of the liquid crystal display panel and eliminate the need for a short-circuit test of the dummy electrodes.

The prior art, as described in Japanese Patent Application Nos. 62-49323 and 4-55022 does not disclose a liquid crystal display device having a combination of features containing color filters, or a combination of features of the present invention of:

(1) each of the dummy electrodes being sub-divided into a plurality of sub-electrodes arranged in the direction perpendicular to the first or second plurality of electrodes;

(2) the sub-electrodes including a large-area sub-electrode disposed in the marginal area within a display area defined by a frame of the liquid crystal display device and a plurality of small-area sub-electrodes disposed in the marginal area outside the display area; and (3) the width of each of the dummy electrodes on the at least one of the first and second substrates being smaller than the width of each of the first and second plurality of electrodes on the first or second substrate opposing the at least one of the first and second substrates.

BRIEF DESCRIPTION OF THE DRAWINGS

In the accompanying drawings:

FIG. 5A is a plan view illustrating an arrangement of segment electrodes, common electrodes, and dummy electrodes of the color liquid crystal display panel shown in FIG. 2;

DETAILED DESCRIPTION OF THE PREFERRED EMBODIMENTS

Figure 1:
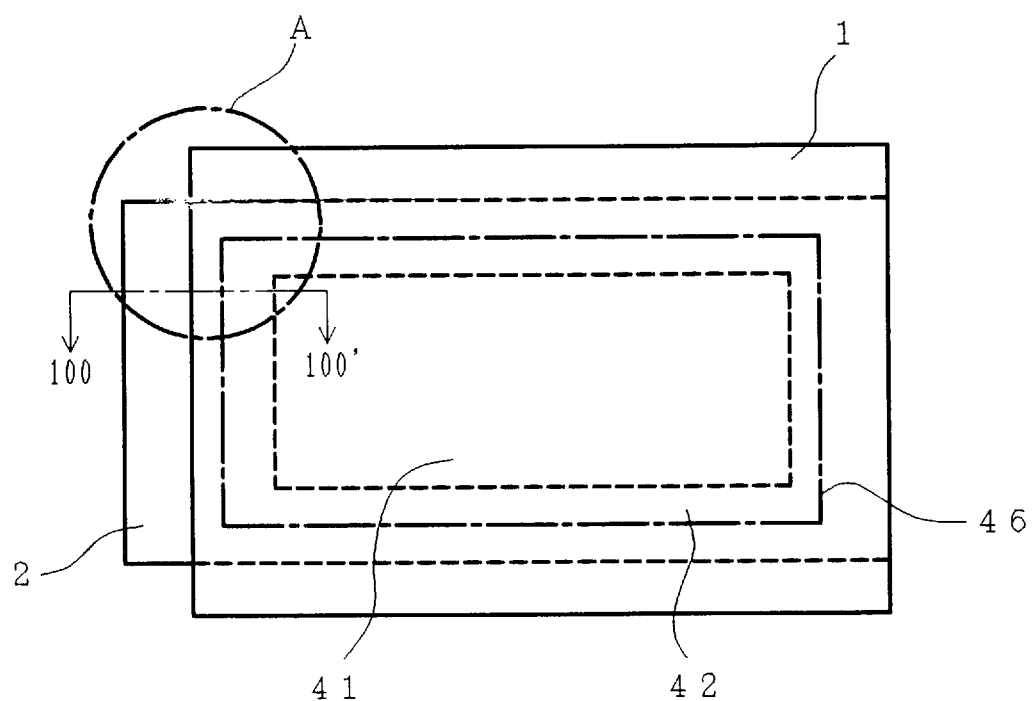
FIG. 1 is a plan view illustrating a color liquid crystal display panel for use in a color liquid crystal display device of the simple matrix type.

The following describes in detail embodiments according to the present invention by reference to the accompanying drawings. The terms color filter and dummy color filter mean colored patterns in this specification.

In the drawings, all the figures use the same reference numerals to identify means having the same features, which are not repeatedly described in the specification.

Figure 7:
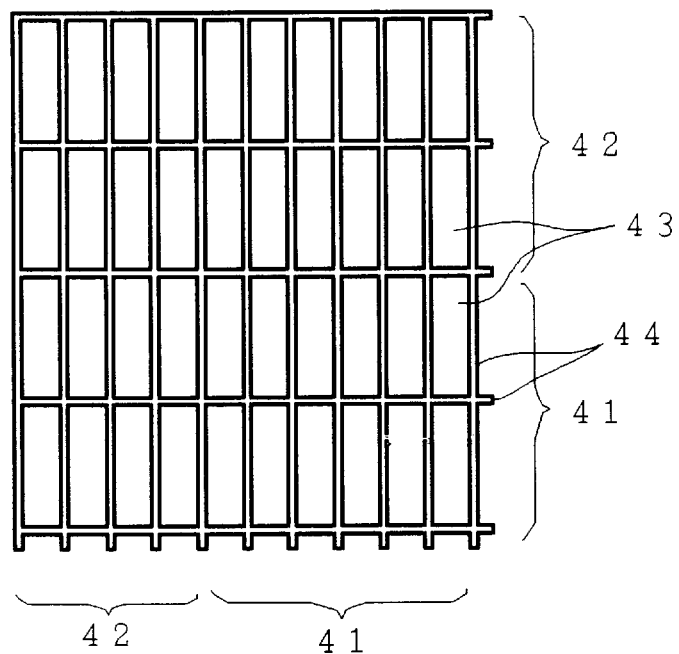
FIG. 7 is a plan view of major portions of the color filter-carrying substrate, that is, the first substrate for use in the liquid crystal display device of the STN type for illustrating one embodiment according to the present invention.

FIG. 7 depicts a plan view illustrating major portions of the color filter-carrying substrate, a first substrate for use in the liquid crystal display device of the STN type forming one embodiment according to the present invention. In the figure are indicated an optically switchable area 41, an optically non-switchable area (dummy area) 42, color filters 43, and a light blocking pattern (BM) 44.

As shown in the figure, the optically switchable area 41 is surrounded by the optically non-switchable area 42.

In the optically switchable area 41 and the optically non-switchable area 42, a plurality of kinds of color filters red (R), green (G) and blue (B) are individually surrounded by the light blocking pattern 44, to define each elemental color filter optically and to ensure resolution.

In this embodiment, the pattern of the BM 44 and the structure of the color filters 43 in the dummy area 42 are the same as those in the optically switchable area and both the areas are fabricated in the same way.

Figure 4:
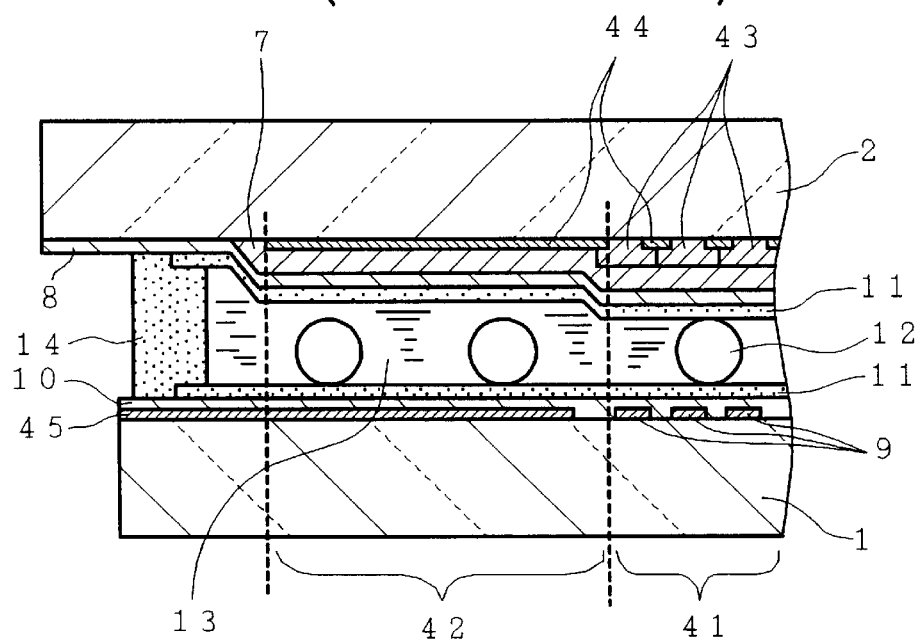
FIG. 4 is a cross-sectioned view illustrating major portions of the color filter-carrying substrate, that is, the first substrate, for use in the prior art liquid crystal display panel shown in FIG. 3.
Figure 8:
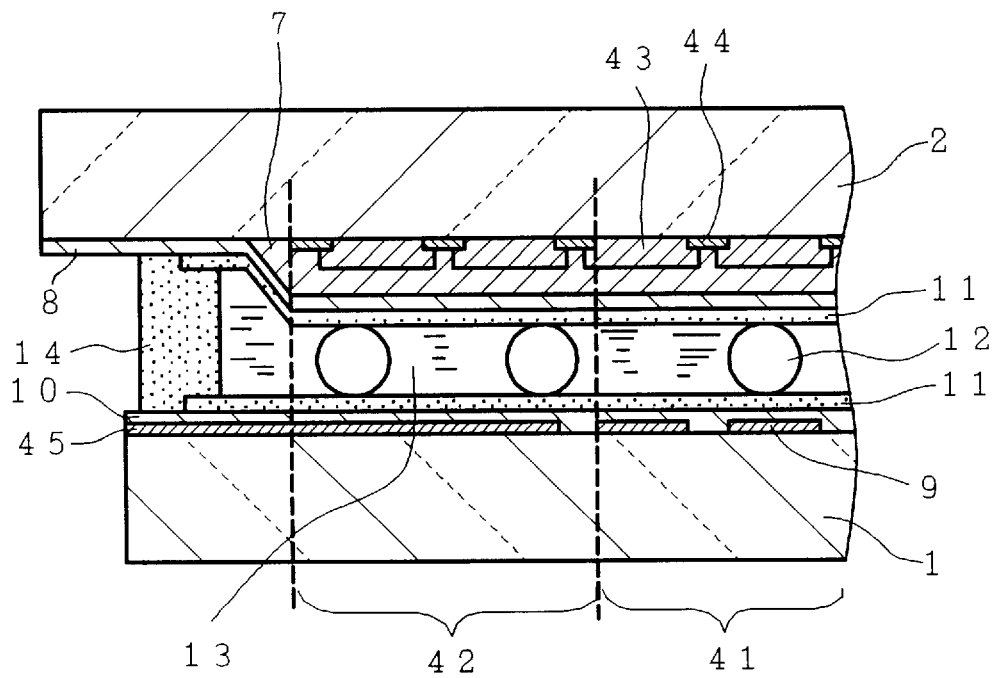
FIG. 8 is a cross-sectioned view illustrating major portions of the liquid crystal display panel of the present invention.

FIG. 8 depicts a cross-sectioned view illustrating major portions of the liquid crystal display panel of the present invention. Arrangements and parts in the figure identical with those in FIGS. 4 and 7 are indicated by the same numbers. In the figure are indicated a first substrate (common electrode substrate) 2, a second substrate 1, an overcoat layer 7, common electrodes 8, segment electrodes 9 for switching, a dummy segment electrode 45, an insulating film 10 formed on the second substrate 1 only, alignment films 11, a liquid crystal layer 13, a sealing member 14, and polymer beads 12 acting as spacers.

The color filters 43 are formed of resins containing pigments of the corresponding colors and arranged in a predetermined order, for example, in a lateral order of R, G, and B in the figure. The film thickness of the color filters 43 is, for example, around 2 μm.

The BM 44 is formed of a resin containing a black pigment. The film thickness of the BM 44 is, for example, around 1 μm.

The overcoat layer 7 is formed of a transparent resin. The film thickness of the overcoat layer 7 is, for example, around 5 μm.

As shown in the figure, the color filters 43 and the BM 44 are formed in the dummy area 42 in the same pattern as in the optically switchable area 41 to equalize the cell gap of the dummy area 42 with that of the optically switchable area 41.

Such a structure can establish uniformity of the cell gaps over both the optically switchable area 41 and the dummy area 42 even if the first and second substrates are pressed together to bond. The structure also does not produce local variations in threshold voltage and a quality image can be obtained.

The structure can decrease a step at the boundary between the dummy area which is the optically non-switchable area and the optically switchable area. This prevents local variations in brightness involved in the prior arts and degradation of image quality.

In the embodiment described above, the structure of the color filters arranged in the dummy area is exactly the same as that in the optically switchable area in terms of the number of colors, three, for instance, as well as the order of arrangement of colors, but the present invention is not limited to this structure. It is possible to form color filters in the dummy area with filters of one color or two chosen from among the plurality of colors of the filters in the optically switchable area at the time of forming the color filter or color filters in the optically switchable area for the purpose of simplifying the fabrication of the dummy area, and to obtain the above-mentioned advantages.

The first substrate (common electrode substrate) 2 has a first polarizing film bonded on the underside thereof and the second substrate 1 has a phase compensating film and a second polarizing film bonded on the top surface thereof to form a liquid crystal display device of the so-called STN (Supper Twisted Nematic) type. However, polarizing and phase compensating films are not shown in the figure.

The following describes a method of fabricating the liquid crystal display device of the present invention.

Figure 9A:
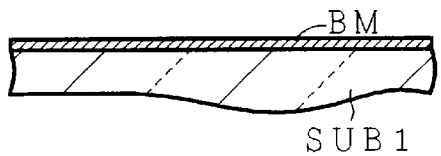
FIGS. 9A through 9I are cross-sectioned views of the liquid crystal display panel illustrating a process of steps of fabricating one embodiment of the liquid crystal display panel of the present invention.
Figure 9B:
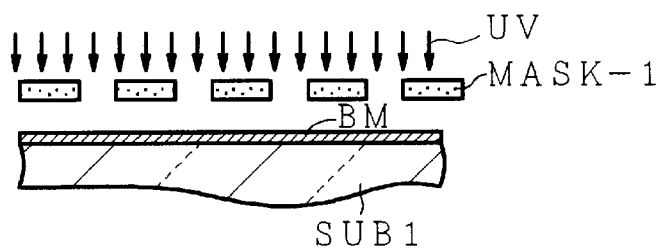
Figure 9C:
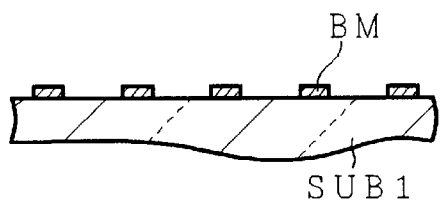

FIGS. 9A through 9I depict cross-sectioned views of the liquid crystal display panel illustrating a process of steps of fabricating one embodiment of the liquid crystal display panel of the present invention. The steps in FIGS. 9A through 9I form a series of process steps. Referring to FIG. 9A, a transparent glass substrate SUB1, corresponding to the first substrate (common electrode substrate) 2 in FIG. 8, is coated with a negative photo-sensitive resin film CK2000, which is a trade mark of Fuji Hunt Electronics Technology Co., Ltd., having a black pigment dispersed therein, by way of spin coating or the like. In FIG. 9B, the substrate is exposed to ultraviolet rays through a photo-mask MASK-1 having a predetermined aperture pattern. In FIG. 9C, the pattern is developed. These steps form a black matrix (BM) of around 1.0 μm thickness by way of a known technique of photolithography.

The BM forming photo-mask MASK-1 used in the exposure step (FIG. 9B) has the same aperture pattern in the area corresponding to an area surrounding the optically switchable area of the substrate as that in the area corresponding to the optically switchable area.

Figure 9D:
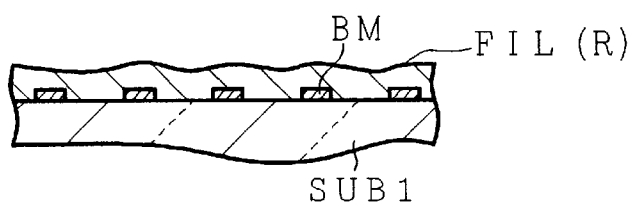
Figure 9E:
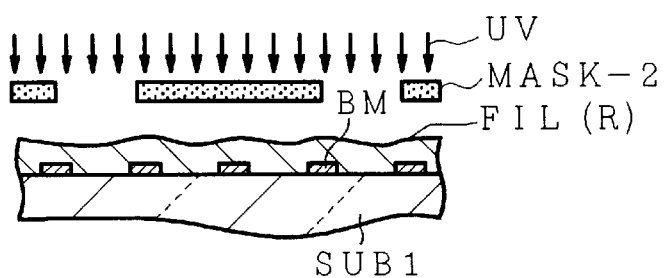
Figure 9F:
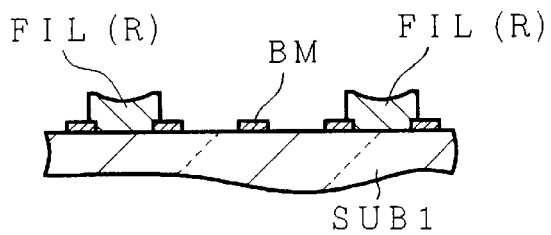

Referring to FIG. 9D, the BM is coated with a red photo-sensitive resin film CR-2000, which is a trade mark of Fuji Hunt Electronics Technology Co., Ltd., having red pigments dispersed therein, in the same way as the above-described BM forming step, to form a red color filter as a first color filter layer. In FIG. 9E, the first color filter layer is exposed to the ultraviolet ray through a photo-mask MASK-2 having a predetermined aperture pattern and is developed. As shown in FIG. 9F, a red color filter FIL(R) is completed by way of photolithography.

Figure 9G:
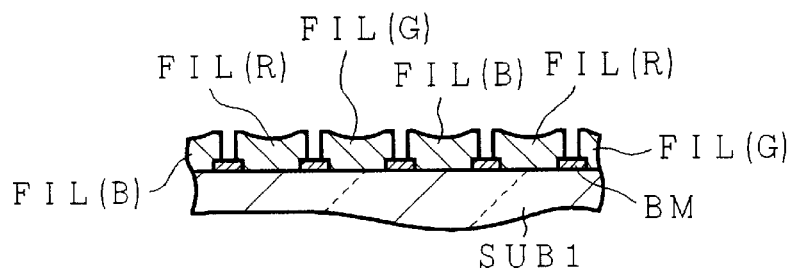

Next, a green photosensitive resin film CG-2000, which is a trade mark of Fuji Hunt Electronics Technology Co., Ltd., having green pigments dispersed therein, is coated on the substrate of FIG. 9F in the same way as the above-described BM forming step, is exposed to ultraviolet rays through a photo-mask having a predetermined aperture pattern, is developed, and a green color filter FIL(G) is patterned. Then, a blue photo-sensitive resin film CB-2000, which is a trade mark of Fuji Hunt Electronics Technology Co., Ltd., having blue pigments dispersed therein, is coated on the substrate to form a blue color filter FIL(B) as shown in FIG. 9G.

Figure 9H:
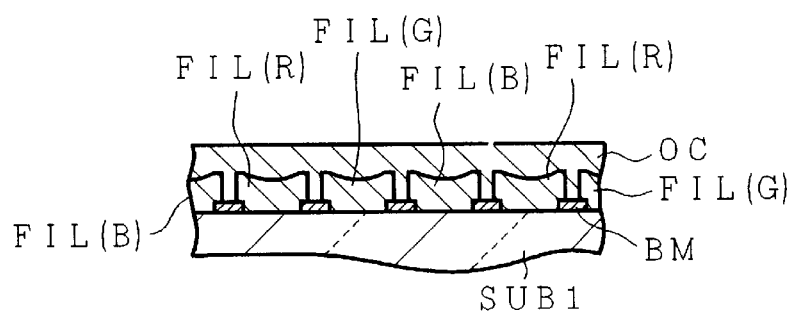
Figure 9I:
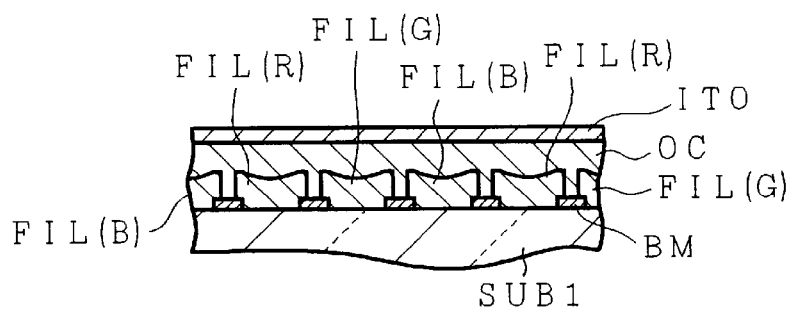

In FIG. 9H, the substrate having the three color filters formed thereon is coated with a protective layer (overcoat) OC for protection of the color filters. In FIG. 9I, further, the substrate is coated with a transparent film of ITO by way of sputtering or the like.

After that the above-mentioned transparent film is patterned by etching. On that is formed an alignment film ORI.

The transparent glass substrate SUB 1 processed as described above is bonded with the other transparent glass substrate (second substrate 1 of FIG. 8) having the transparent picture element electrodes and the alignment film formed thereon. A liquid crystal material is filled into a gap between the substrates.

An evaluation by operating the liquid crystal display device confirmed that a difference in brightness did not occur between the central optically switchable area and an area around its periphery, unlike in the prior art device, and any non-uniformity in display contrast was eliminated.

The fabrication process of the liquid crystal display panel of the present invention is not limited to the above-described one in which negative photo-sensitive resins are used to form the black matrix BM, the red color filter (R), the green color filter (G), and the blue color filter (B) by way of photolithography. The fabrication process may use any other desirable materials, filming methods, and panel fabrication methods.

The following describes another embodiment of the color liquid crystal display panel of the present invention, but only by referring to those portions which are different from FIGS. 1, 2, 5A and 5B.

Figure 10:
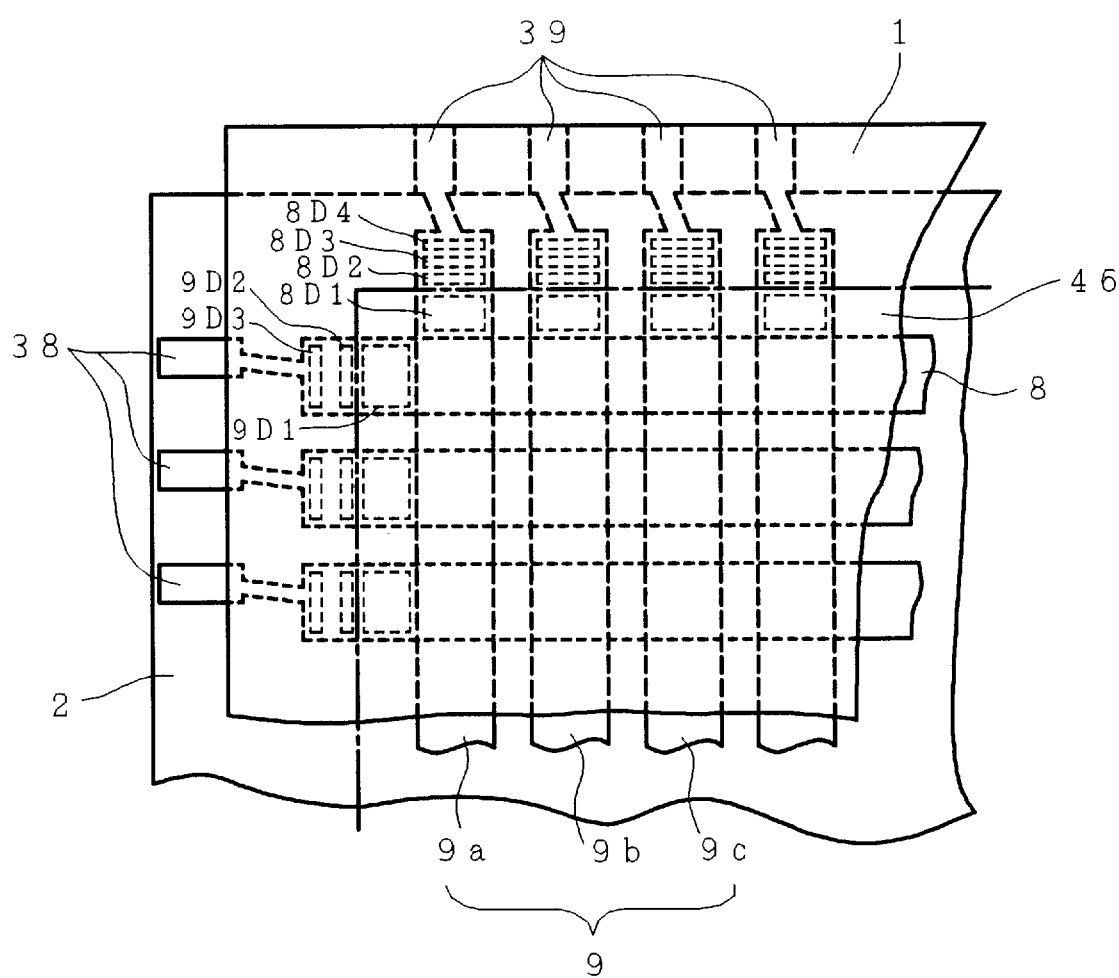
FIG. 10 is a plan view illustrating an arrangement of segment electrodes, common electrodes, and dummy electrodes of the color liquid crystal display panel of another embodiment of the present invention.

FIG. 10 depicts a plan view illustrating an arrangement of segment electrodes, common electrodes, and dummy electrodes of the color liquid crystal display panel of another embodiment.

Figure 11:
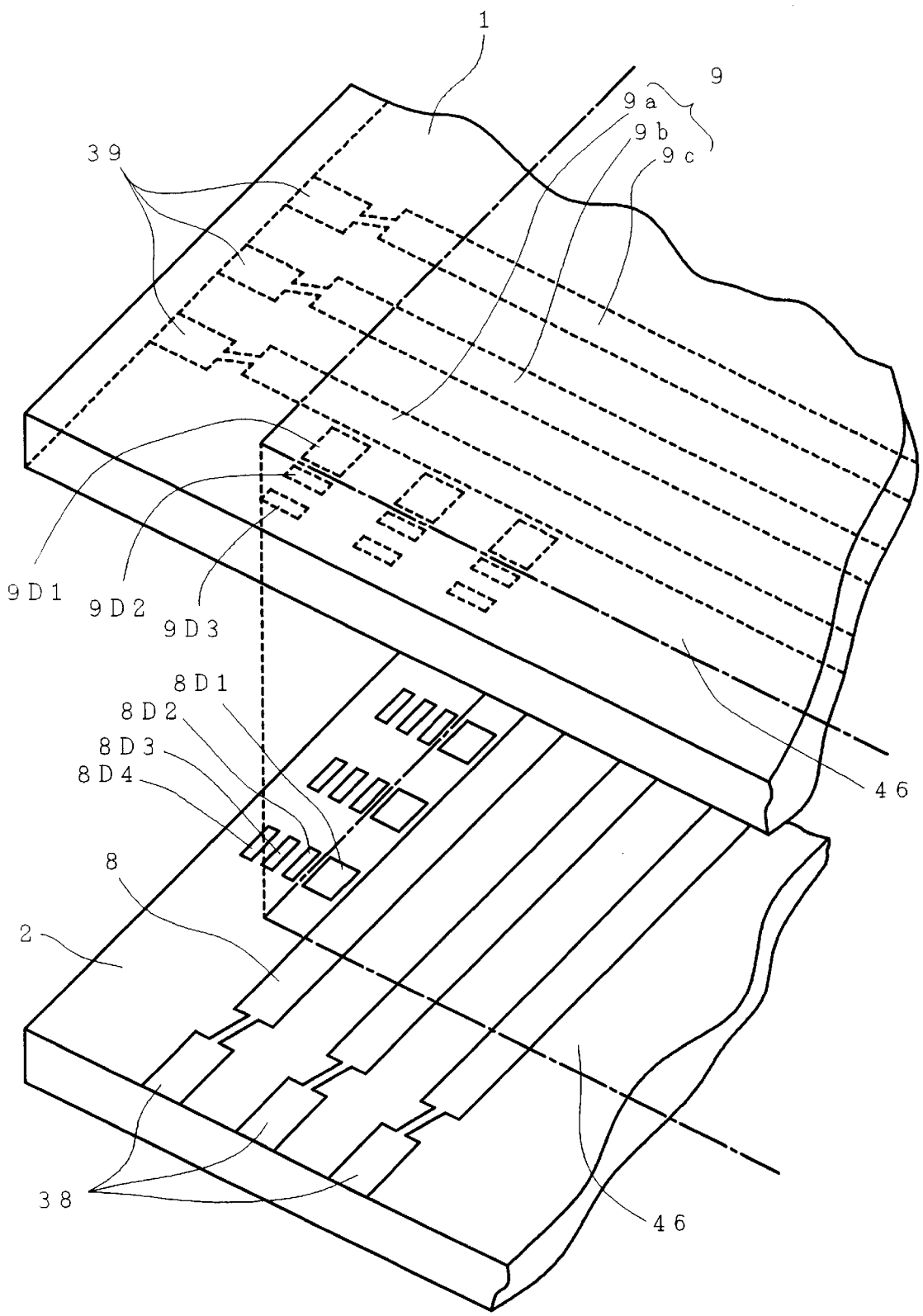
FIG. 11 is an exploded perspective view of the color liquid crystal display panel in FIG. 10; and, FIG. 12 is an exploded perspective view illustrating the overall structure of the liquid crystal display device of one embodiment of the present invention.

FIG. 11 depicts an exploded perspective view illustrating the color liquid crystal display panel of FIG. 10.

In FIGS. 10 and 11 a segment electrode substrate 1, a common electrode substrate 2, common electrodes 8, segment electrodes 9, dummy sub-electrodes 8D1 to 8D4 and 9D1 to 9D3, and terminals 38 and 39 for the common electrodes 8 and the segment electrodes 9, respectively, are shown.

Figure 2:
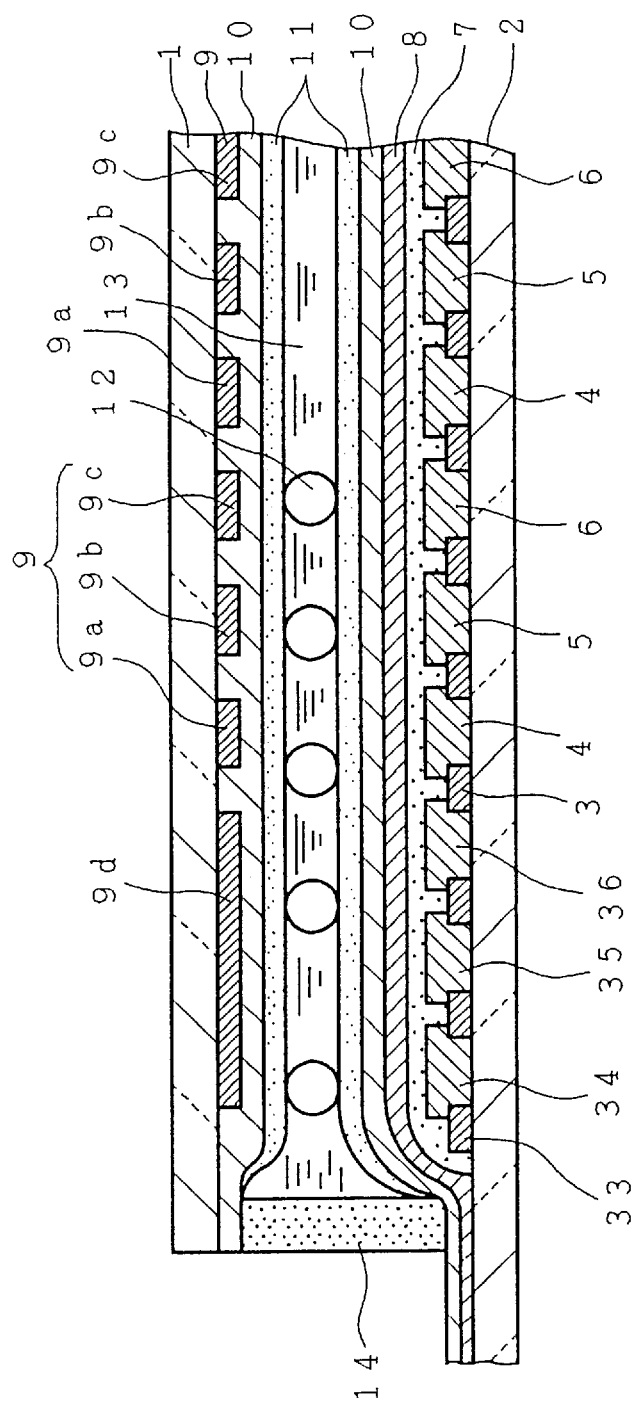
FIG. 2 is a cross-sectioned view of the color liquid crystal display panel taken along line 100—100' of FIG. 1.
Figure 3:
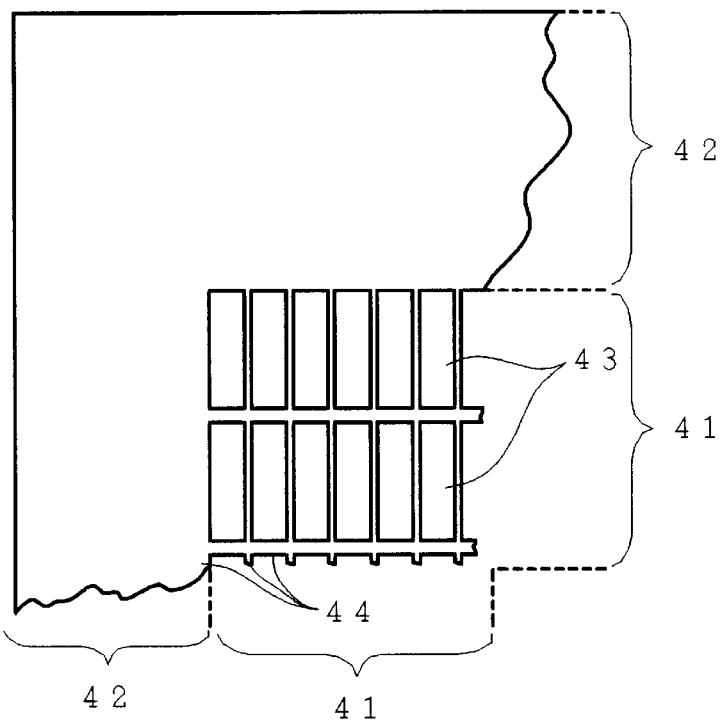
FIG. 3 is a plan view illustrating major portions of a prior art color filter-carrying substrate, that is, a first substrate, for use in the liquid crystal display panel of the STN type.

In this embodiment, like the prior art in FIG. 2, the common electrode substrate 2 is formed of glass or the like, and color filters, a light blocking film, a protective layer, and the common electrodes 8 are formed on the common electrode substrate 2.

The segment electrode substrate 1, like the prior art in FIG. 2, is formed of glass or the like and has the segment electrodes 9 in the form of strip-like transparent electrodes of ITO formed thereon orthogonal to the common electrodes 8.

The segment electrodes 9 include segment electrodes 9a, 9b, and 9c for colors of red (R), green (G), and blue (B), respectively.

The color liquid crystal display panel of this embodiment, like the prior art in FIG. 2, has a segment electrode substrate 1 and a common electrode substrate 2 bonded together with a sealing material therebetween. A liquid crystal material for the STN type is injected via an opening (not shown) in the sealing material. The opening is sealed with an epoxy resin or the like.

Figure 5B:
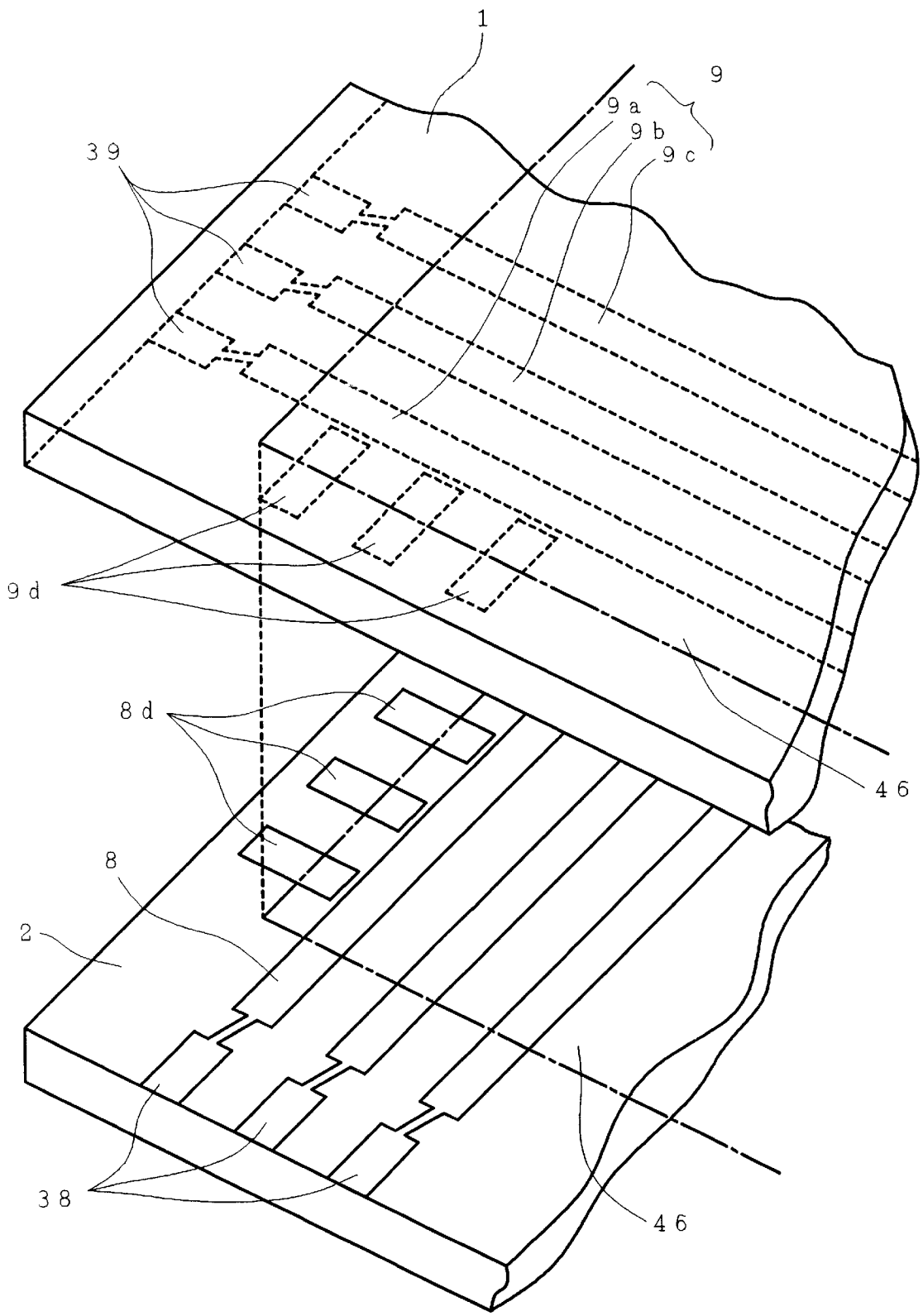
FIG. 5B is an exploded view illustrating the color liquid crystal display panel shown in FIG. 2.
Figure 6:
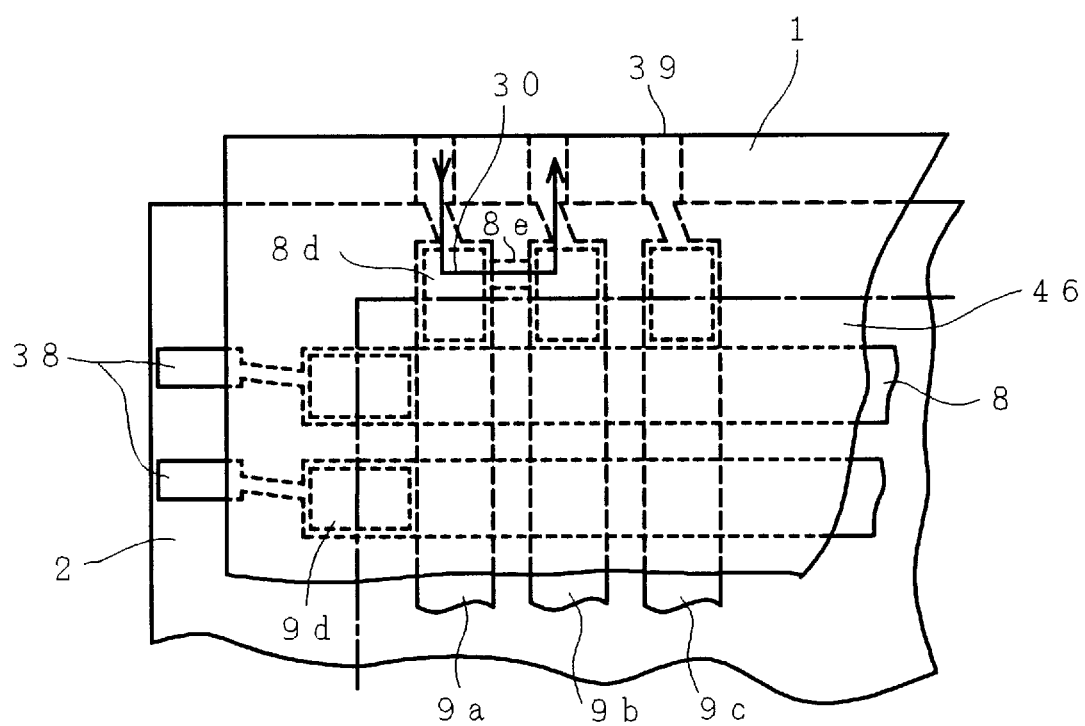
FIG. 6 is a plan view illustrating a short-circuit of adjacent dummy electrodes of the color liquid crystal display panel shown in FIG. 5A.

As shown in FIGS. 10 and 11, in the color liquid crystal display panel of this embodiment the dummy electrodes 8d and 9d shown in FIGS. 5A and 5B which extend in a direction perpendicular to the segment electrodes 9 and the common electrodes 8, respectively are divided into the plurality of a dummy sub-electrodes 8D1 to 8D4 and 9D1 to 9D3, respectively. The dummy sub-electrodes 8D1 and 9D1 are within the display area 46 defined by a frame of the liquid crystal display device, and dummy sub-electrodes 8D2 to 8D4 and 9D2 and 9D3 are outside the display area 46.

The widths of the plurality of dummy sub-electrodes 8D1 to 8D4 and 9D1 to 9D3 are equal to or a little narrower than those of the opposing common electrodes 8 and segment electrodes 9, respectively.

The probability of short-circuit of adjacent dummy electrodes is ordinarily in proportion to the lengths of the adjacent dummy electrodes, and the lengths of the useful adjacent dummy electrodes within the display area are ordinarily shorter than those of the dummy electrodes outside the display area.

Therefore, in this embodiment, the probability of a short-circuit of adjacent dummy sub-electrodes 8D1 or 9D1, respectively, within the display area is lower than that of the adjacent dummy sub-electrodes 8D2 to 8D4 or 9D2 and 9D3 outside the display area.

For this reason, the color liquid crystal display panel of this embodiment can decrease the probability of short-circuit failure of the adjacent dummy sub-electrodes 8D1 or 9D1 in the display area. This can prevent spurious switching-on of the optically non-switchable area and improve the image quality of the liquid crystal display panel.

Further, it is possible with the color liquid crystal display panel of this embodiment to omit the short-circuit test of the dummy electrodes and to shorten the test time.

Even if the dummy sub-electrodes 8D2 to 8D4 or 9D2 and 9D3 outside the display area are short-circuited, the area outside the display area is the area covered by a frame having a rectangular window. The short-circuit does not adversely affect the image quality of the color liquid crystal display panel.

In FIGS. 10 and 11, each of the dummy sub-electrodes 8D1 and 9D1 in the display area is formed of one dummy sub-electrode. It need hardly be said that it may be formed of two or more dummy sub-electrodes.

However, as described above, to decrease the probability of short-circuit failure of the adjacent dummy sub-electrodes in the display area and to prevent spurious switching-on in the optically non-switchable area within the display area, it is desirable to form the dummy sub-electrodes so that the dummy sub-electrodes should not lie across the boundary between the display area and the outside area.

Also, only the dummy electrodes of one electrode substrate, for example, the common electrode substrate 2, may be formed of a plurality of the dummy sub-electrodes.

In this embodiment, on both the segment electrode substrate 1 and the common electrode substrate 2 the dummy electrodes are formed of a plurality of the dummy sub-electrodes. This invention is not limited to such a structure, but may have the dummy electrode formed of a plurality of the dummy sub-electrodes on only one electrode substrate, for example, the common electrode substrate 2.

Further, the present invention can be applied to a color liquid crystal display panel having common electrodes 8 or segment electrodes 9 divided into two groups, for example, divided vertically or horizontally into two groups.

Still further, the present invention can be applied to a monochrome liquid crystal display panel of the simple matrix type.

As many apparently widely different embodiments of the present invention may be made without departing from the spirit and scope thereof, it is to be understood that the present invention is not limited to the specific embodiments thereof except as defined in the appended claims.

The following summarizes the effects obtained by the typical embodiments of the present invention.

As described above, the dummy electrodes formed on the electrode-carrying substrates of the liquid crystal display panel are formed of a plurality of the dummy sub-electrodes. This can decrease the probability of short-circuit failure of the adjacent dummy sub-electrodes within the display area. This also can prevent spurious switching-on in the optically non-switchable area within the display area and improve the image quality of the liquid crystal display panel.

Also, the present invention can eliminate the need for the short-circuit test of the dummy electrodes so that the test time can be shortened.

It is needless to say that the embodiment shown in FIGS. 10 and 11 can be combined with the embodiment shown in FIGS. 7 and 8.

Figure 12:
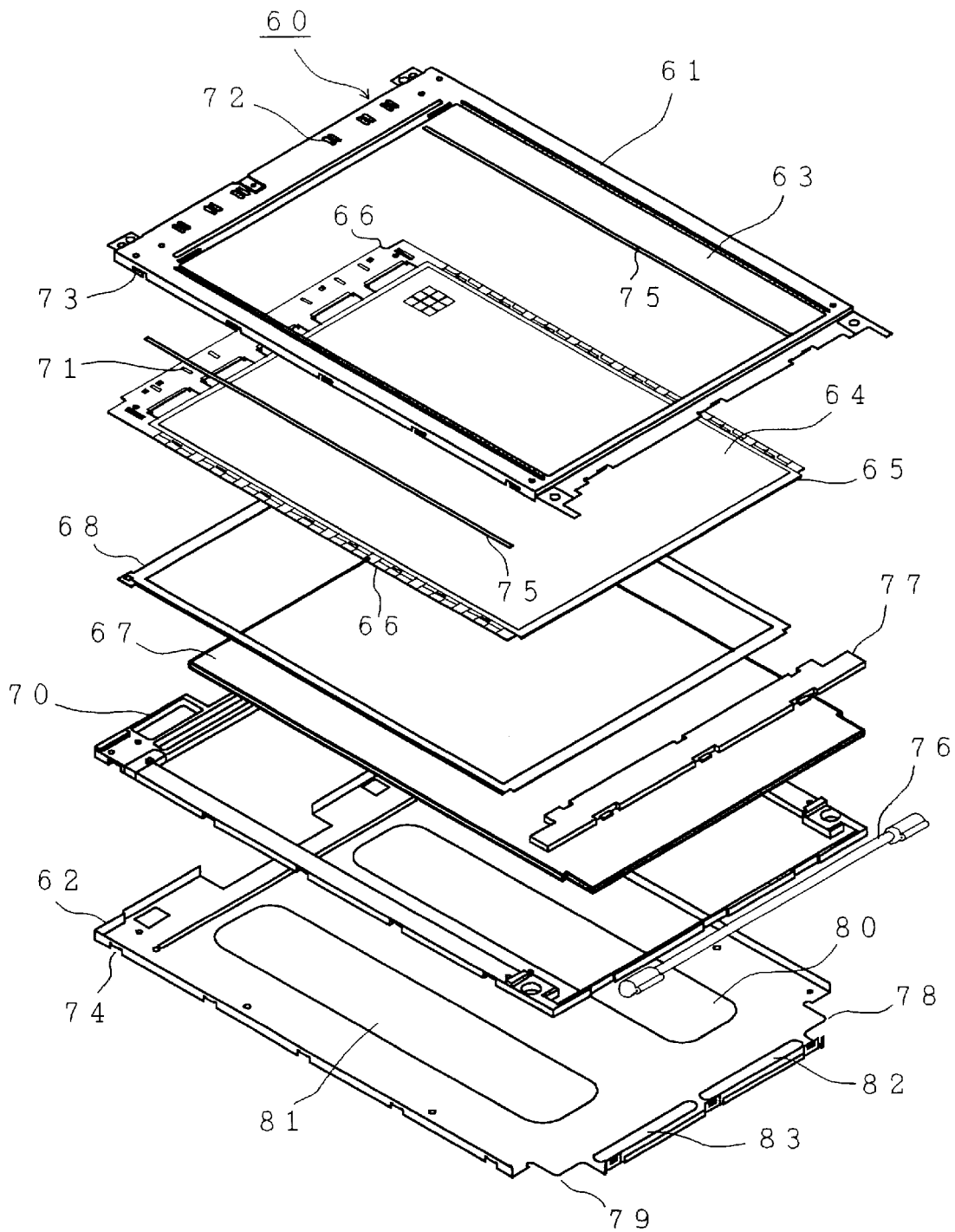

FIG. 12 depicts an exploded perspective view illustrating the overall structure of the liquid crystal display device of the present invention. In the figure are indicated an upper frame 61, a lower frame 62, a display window 63 defining a display area, a liquid crystal display panel assembly 64 formed of optical members, such as polarizing films, and the liquid crystal display panel described in the embodiments, a driving circuit board 65, a spacer 68, a light guide assembly 67 formed of a light diffuser, a light guide, and a reflective sheet, an intermediate frame 70 for mounting a linear back-light source, a linear back light source (lamp) 76 formed of the cold cathode type, and a lamp cover 77.

Also, in the figure are indicated a grounding pad 71 formed on the driving circuit board 65, tongues press-formed integral with upper frame 72 to be in contact with the grounding pad, claw 73 to be pinched into recesses 74 formed on the lower frame 62, an adhesive tape 75 for fixing the upper frame 61 with the liquid crystal display panel assembly 64, openings 80 and 81 provided at positions symmetric to a line orthogonal to the back-light source at its center, openings 82 and 83 provided in a longitudinal direction of the back-light source 76, and cut-outs 78 and 79 provided below both ends of the back light source 76. The upper frame 61 is formed of a steel plate of, for example, 0.8 mm in thickness. The lower frame 62 is formed of a steel plate or aluminum sheet, for example, O.S mm in thickness.

The liquid crystal display panel assembly 64 is sandwiched and fixed between the upper frame 61 and the lower frame 62 in the order shown in the figure. The intermediate frame 70 has the linear light source (back-light lamp) 76 of the cold cathode type held at an end thereof. The lamp cover 77 blocks a direct passage of light toward the liquid crystal display panel assembly 64 and directs the radiated rays to the light guide assembly 67 made up of a light diffuser and a light guide.

The spacer 68 is interposed between the liquid crystal display panel assembly 64 and the light guide assembly 67 mounted in a recess formed in the intermediate frame 70 to define the display area. The lower frame 62 has at least a pair of the openings 80 and 81 at positions symmetric to a line orthogonal to the back-light source at its center and extending over at least the area of the liquid crystal display panel assembly 64 in a direction orthogonal to the back light source 76. Right below the back light source 76 are formed at least the two openings 82 and 83 provided in the longitudinal direction of the back light source 76 and the cut-outs 78 ad 79 provided below both ends of the back light source 76.

The upper frame 61 formed of a thin stainless plate and the lower frame 62 of a thin aluminum plate make the liquid crystal display device thin and light without decreasing the rigidity of the liquid crystal display device. Heat radiation of the display device can be increased by means of the openings 80 and 81 at positions symmetric to a line orthogonal to the back-light source at its center and extending over at least the area of the liquid crystal display panel assembly 64 in the direction orthogonal to the back light source 76, the two openings 82 and 83 provided right below the back light source 76 in the longitudinal direction of the back light source 76, and the cut-outs 78 and 79 provided below both the ends of the back light source 76. The liquid crystal display panel assembly 64 can be made to have a uniform distribution of temperature over an entire surface thereof. Such effects can prevent non-uniformity in the display contrast.

Since the back light source 76 is energized at a high frequency, a current flows from the back light source 76 to the lower frame 62 through a stray capacity between the lower frame 62 and the back light source 76. The current, called a leakage current, adversely reduces a current for energizing the back light source 76, resulting in reduction of the brightness. The back light source 76 generates heat with time of operation and raises the temperature around it compared with an ambient temperature. If no measures are taken, the heat around the back light source 76 affects the liquid crystal display panel assembly 64 directly so that the temperature of the liquid crystal display panel cannot be made uniform over the display area. To avoid this, the embodiments employ the openings 82 and 83 to prevent the leakage current from lowering the brightness and to make uniform the temperature distribution of the liquid crystal display panel, thereby preventing non-uniformity in the display contrast. The openings 82 and 83 can prevent thermal diffusion of the back light source 76 from lowering the brightness.

Both of the ends of the back light source 76 are portions that are low in temperature and cause the brightness to become low. Both of the ends therefore have to be kept at a high temperature in a range in which the liquid crystal display panel can have a uniform temperature distribution. To do this, the cut-outs 78 and 79 are provided to make the liquid crystal display panel have a uniform temperature distribution and to prevent the brightness from decreasing. The cut-outs 78 and 79 function to provide the same effect as the openings 82 and 83.

The openings 80 and 81 provided at positions symmetric to a line orthogonal to the back-light source at its center and extending over the area of the liquid crystal display panel assembly 64 are effective to reduce the weight of the lower frame 62 and can make uniform the temperature distribution of the liquid crystal display panel.

The embodiments of the present invention can prevent the deterioration of the image quality due to the difference in the liquid crystal layer thickness between the optically switchable area and the optically non-switchable area, thereby obtaining a high quality image display. As described so far, the liquid crystal display device of the present invention can solve the problem of the non-uniform gap around the optically switchable area that is caused by the step between the optically switchable area and the light blocking film around the optically switchable area. Such a feature can suppress the non-uniformity in display contrast around the optically switchable area of the display screen and eliminate deterioration in the image quality while maintaining a sufficient light blocking capability. The feature also can prevent any light leakage from the back-light, thereby obtaining a quality image.

Further, in the liquid crystal display device of the present invention the dummy electrodes formed on the electrode-carrying substrates are divided into a plurality of the dummy sub-electrodes. The liquid crystal display device therefore can decrease the probability of short-circuit failure of the adjacent dummy electrodes within the display area. Such a feature can prevent the spurious switching-on in the optically non-switchable area within the display area, thereby improving the image quality of the liquid crystal display panel.

What is claimed is:

1. A liquid crystal display device including a liquid crystal display panel comprising:

a first substrate having (a) plural sets of filters, each of filters of a set of said plural sets having a different color from other filters of said set and said filters being arranged in a predetermined order, (b) a patterned light blocking film disposed between said filters of said set and between said plural sets of filters so that a portion of said plural sets of filters and said light blocking film are disposed in a marginal area outside of an optically switchable useful area which is optically switchable upon application of an electric field thereto on said liquid crystal display panel, and (c) a first plurality of transparent electrodes disposed on said plural sets of filters;

a second substrate having a second plurality of transparent electrodes thereon arranged to extend transversely to said first plurality of transparent electrodes;

a liquid crystal layer sandwiched between said first and second substrates with said first and second plurality of transparent electrodes opposing each other;

spacers dispersed between said first and second substrates; and a plurality of dummy electrodes formed in said marginal area on at least one of said first and second substrates so as to extend in a direction perpendicular to said first or second plurality of electrodes on said at least one of said first and second substrates and to oppose said first or second plurality of electrodes on said first or second substrate opposing said at least one of said first and second substrates so that each of said dummy electrodes is sub-divided into a plurality of sub-electrodes arranged in said direction perpendicular to said first or second plurality of electrodes;

wherein said sub-electrodes include a large area sub-electrode disposed in said marginal area within a display area delimited by a frame of said liquid crystal display device and a plurality of small-area sub-electrodes disposed in said marginal area outside said display area and the width of each of said dummy electrodes on said at least one of said first and second substrates is smaller than the width of each of said first and second plurality of electrodes on said first or second substrate opposing said at least one of said first and second substrates.

\* \* \* \* \*